US011692801B2

(12) United States Patent
Verduin

(10) Patent No.: US 11,692,801 B2
(45) Date of Patent: Jul. 4, 2023

(54) MODULAR GAGE SYSTEM

(71) Applicant: Arbor Gage & Tooling, Inc., Grand Rapids, MI (US)

(72) Inventor: Jacob Ethan Verduin, Byron Center, MI (US)

(*) Notice: Subject to any disclaimer, the term of this patent is extended or adjusted under 35 U.S.C. 154(b) by 111 days.

(21) Appl. No.: 17/447,850

(22) Filed: Sep. 16, 2021

(65) Prior Publication Data
US 2022/0082365 A1 Mar. 17, 2022

Related U.S. Application Data

(60) Provisional application No. 63/079,104, filed on Sep. 16, 2020.

(51) Int. Cl.
*G01B 3/00* (2006.01)

(52) U.S. Cl.
CPC .................................. *G01B 3/002* (2013.01)

(58) Field of Classification Search
CPC ........................................................ G01B 3/002
USPC ........................................ 33/567, 567.1, 568
See application file for complete search history.

(56) References Cited

U.S. PATENT DOCUMENTS

| | | | | |
|---|---|---|---|---|
| 4,586,261 A * | 5/1986 | Beaupere | ............... | G01B 3/002 33/555 |
| 4,641,819 A * | 2/1987 | Poland | ............... | B23K 37/0443 269/45 |
| 5,586,771 A * | 12/1996 | Koskinen | ............ | G01D 5/34761 33/705 |
| 6,279,888 B1 * | 8/2001 | Wal, III | ................. | B23Q 3/103 269/37 |
| 6,364,302 B2 * | 4/2002 | Ausilio | ................... | B25B 5/006 269/238 |
| 7,036,810 B2 * | 5/2006 | Wal, III | ................ | B23Q 3/183 269/296 |
| 7,796,278 B2 * | 9/2010 | Spalding | ............ | G01B 11/2425 356/639 |
| 7,812,970 B2 * | 10/2010 | Nygaard | ................. | G01S 17/48 356/602 |
| 7,907,267 B2 * | 3/2011 | Spalding | ................ | G01B 11/08 356/228 |
| 8,727,329 B2 | 5/2014 | Schron et al. | | |
| 9,372,160 B2 * | 6/2016 | Nygaard | ............ | G01N 21/9515 |
| 9,981,374 B2 * | 5/2018 | Hinz | ...................... | G01B 3/002 |
| 10,746,574 B2 * | 8/2020 | Kikuchi | ............. | G01D 5/34707 |
| 11,513,427 B2 * | 11/2022 | Fehr | ................... | F16M 11/2007 |
| 2021/0122062 A1 * | 4/2021 | Kllibarda | ............... | B25J 9/0093 |

(Continued)

FOREIGN PATENT DOCUMENTS

| | | |
|---|---|---|
| CN | 204771676 U | 11/2015 |
| CN | 109877744 A | 6/2019 |
| DE | 3807914 A1 | 9/1989 |

(Continued)

*Primary Examiner* — George B Bennett
(74) *Attorney, Agent, or Firm* — Oppenhuizen Law PLC; David L. Oppenhuizen

(57) ABSTRACT

A modular gage system includes a base plate having an array of holes and a coordinate system to identify each hole. The modular gage system further includes a plurality of risers and at least one form block. Each riser is assigned to a particular hole and the at least one form block is configured to be positioned atop one or more of the risers. Moreover, each form block is assigned to be located over a particular hole.

20 Claims, 13 Drawing Sheets

(56) References Cited

U.S. PATENT DOCUMENTS

2021/0172845 A1* 6/2021 DeWald ................. G01N 3/068

FOREIGN PATENT DOCUMENTS

DE 202008015100 U1 1/2009
EP 1930093 A1 6/2008

* cited by examiner

| LOCATION | BOTTOM | MIDDLE | TOP |
|----------|--------|--------|-----|
| K03 | 0003_02101 | NA | 0003_02001 |
| K05 | 0003_02101 | NA | 0003_02001 |
| D10 | 0003_02102 | NA | 0003_02001 |
| F10 | 0003_02102 | NA | 0003_02001 |
| F12 | 0003_02001 | 0003_02002 | 0003_02002 |
| H12 | 0003_02001 | 0003_02002 | 0003_02002 |
| K16 | 0003_02001 | NA | 0003_02001 |
| K18 | 0003_02001 | NA | 0003_02001 |

FIG. 14

MODULAR GAGE SYSTEM

BACKGROUND OF THE INVENTION

1. Field of the Invention

The present invention generally relates to a gage system. More particularly, the present invention pertains to a modular gage system suitable to inspect and verify part sizes and tolerances in manufacturing.

2. Description of the Prior Art

Currently, gage systems typically include a horizontal base plate placed on a cart, a plurality of risers extending upwardly and/or outwardly from the baseplate, and form blocks secured at the top of each riser for inspecting and verifying sizes and tolerances of parts. However, each of the gages are very large and heavy, and custom manufactured for each individual part. These gages are for single use, and the entire gage is scrapped once the part goes out of production. Furthermore, it also takes a relatively long amount of time to build each of these gages. As a result, the existing gage systems are expensive and time consuming to manufacture.

SUMMARY OF THE INVENTION

According to an aspect of the disclosure a modular gage system is disclosed. The modular gage system includes a base plate having an array of holes and a coordinate system to identify each hole. The modular gage system further includes a plurality of risers and at least one form block. Each riser is assigned to a particular hole and the at least one form block is configured to be positioned atop one or more of the risers. Moreover, each form block is assigned to be located over a particular hole.

At least one of the form blocks may be configured to support a workpiece. Additionally, at least one stab block may be included and configured to be positioned atop one or more of the risers, each stab block being assigned to be located over a particular hole.

Optionally, two or more risers may be assigned to a particular hole, and the risers assigned to the same particular hole may be stacked one atop the other. In addition, each form block may optionally be assigned to two or more particular holes.

At least one riser in the plurality of risers may include a first longitudinal end and a second longitudinal end. There may be a first engagement structure protruding outwardly from the first longitudinal end along a longitudinal axis of the riser, and a second engagement structure protruding outwardly from the second longitudinal end along the longitudinal axis. Furthermore, there may optionally be included a first alignment structure protruding outwardly from the first longitudinal end and a second alignment structure protruding outwardly from the second longitudinal end.

The second engagement structure can optionally include a ball lock mechanism having a plurality of balls configured to selectively be retracted within the second engagement structure, or to selectively radiate partially outward through an outer cylindrical wall of the second engagement structure.

The form block can optionally include a first hole configured to receive the first engagement structure, and a locating hole configured to receive the first alignment structure.

The stab block can optionally include a second hole configured to receive the first engagement structure, and a locating hole configured to receive the first alignment structure.

Optionally, the base plate can include an annular recess which is configured to receive a portion of each of the plurality of balls in the ball lock mechanism when the plurality of balls are radiated partially outward through the outer cylindrical wall of the second engagement structure, thereby locking the second engagement structure into one of the holes in the array of holes.

The ball lock mechanism optionally includes an "L"-shaped channel extending through a portion of the riser, a vertical section of the channel that includes a sliding shaft having an actuator end which abuts against each of the balls in the plurality of balls, and a horizontal section of the channel that includes an actuator shaft which is configured to receive an input from an external force to selectively activate or deactivate the ball lock mechanism.

Optionally there is provided an insert placed within at least one hole in the array of holes in the base plate, and the insert includes an annular recess.

For a more complete understanding of the present invention, reference is made to the following detailed description and accompanying drawings. In the drawings, like reference characters refer to like parts throughout the views in which:

BRIEF DESCRIPTION OF THE DRAWINGS

FIG. 14 illustrates an exemplary table having instructions for assembling the plurality of risers on the base plate, with an embodiment of the disclosure;

DETAILED DESCRIPTION OF A PREFERRED EMBODIMENT

Figure 1:
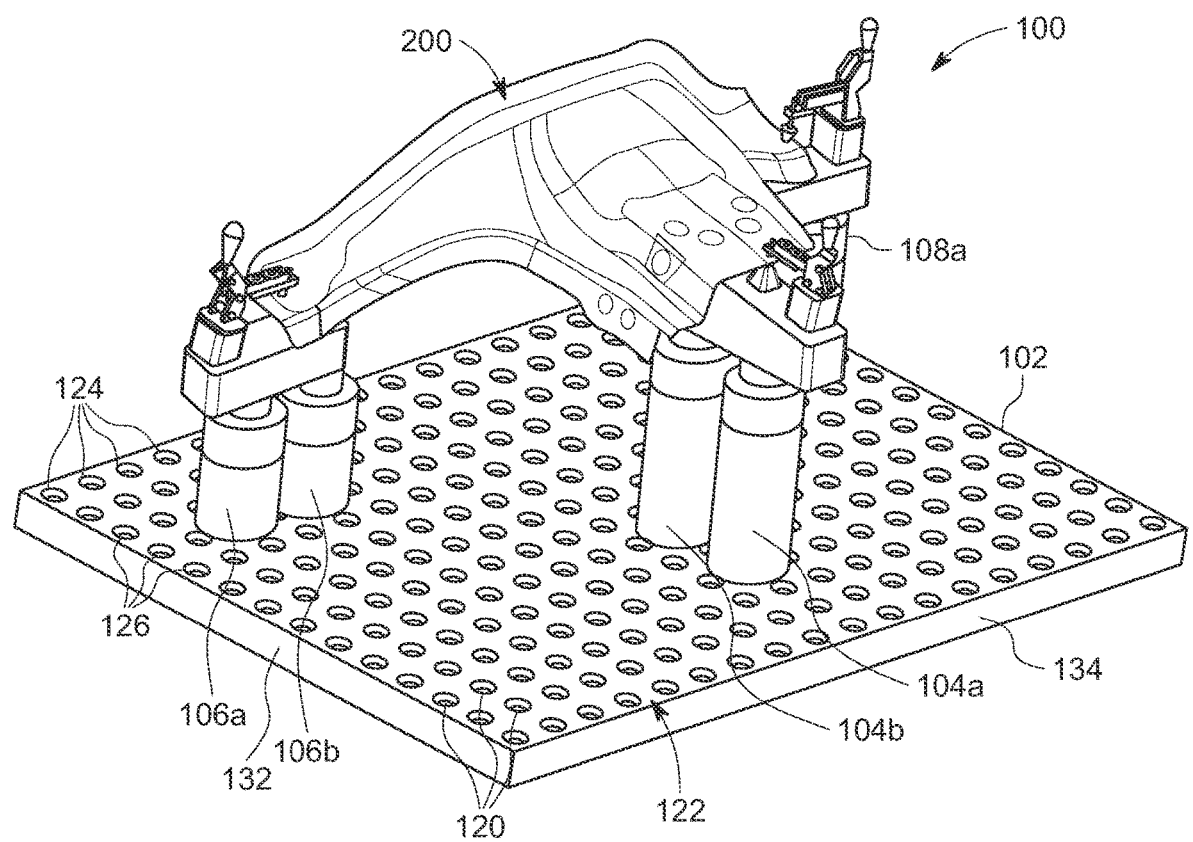
FIG. 1 illustrates a modular gage system with a workpiece mounted on form blocks of the modular gage system, in accordance with an embodiment of the disclosure.
Figure 2:
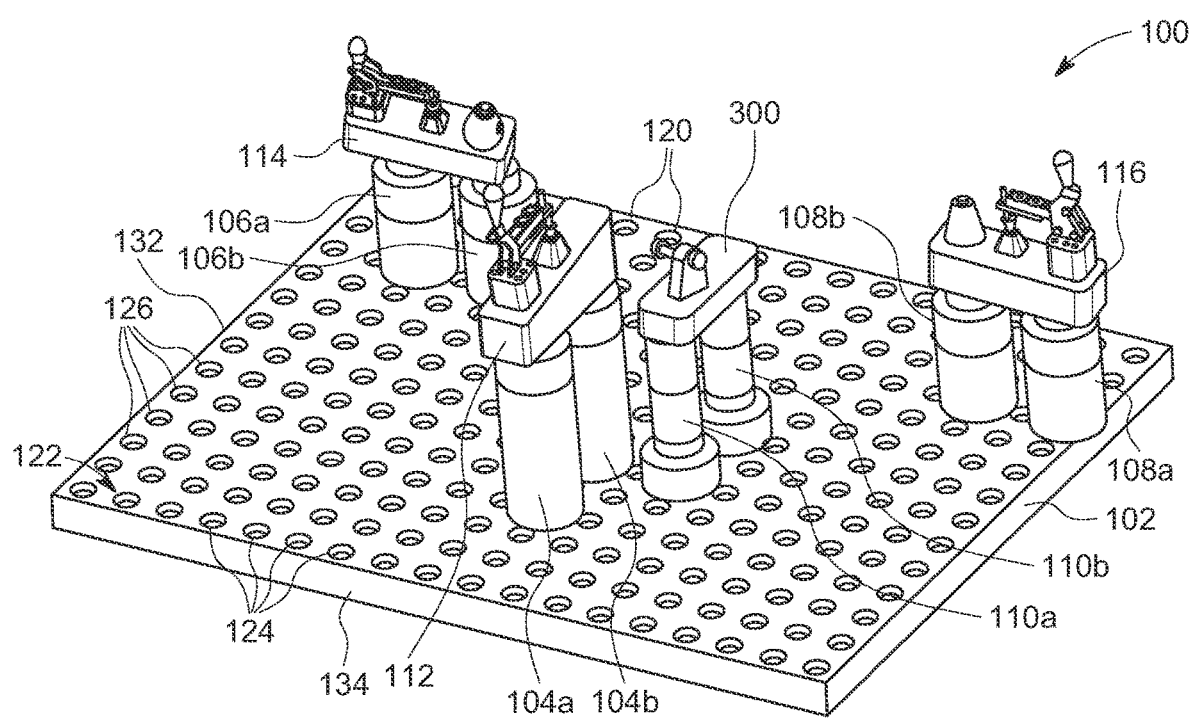
FIG. 2 illustrates the modular gage system with the workpiece removed and depicting a plurality of riser assemblies mounted on a base plate, in accordance with an embodiment of the disclosure.

Referring to FIG. 1 and FIG. 2, a modular gage system 100 to facilitate inspection and measurement of a workpiece 200 is shown. The modular gage system 100 includes a base plate 102, and a plurality of riser assemblies, for example, a first riser assembly 104a, a second riser assembly 104b, a third riser assembly 106a, a fourth riser assembly 106b, a fifth riser assembly 108a, a sixth riser assembly 108b, a seventh riser assembly 110a, and an eighth riser assembly 110b, which are adapted to be mounted on the base plate 102. The modular gage system 100 also includes at least one form block, for example, a first form block 112, a second form block 114, and a third form block 116, configured to be positioned atop the plurality of riser assemblies. For example, the first form bock 112 is positioned on the first riser assembly 104a and the second riser assembly 104b, the second form block 114 is mounted atop the third riser assembly 106a and the fourth riser assembly 106b, and the third form block 116 is mounted on the fifth riser assembly 108a and the sixth riser assembly 108b. Although eight riser assemblies and three form blocks are shown, it may be envisioned that the modular gage system may include any suitable number and size of riser assemblies to support any number and size of form blocks. Furthermore, each of the plurality of riser assemblies may include at least one riser 118 (best shown in FIG. 4). A construction and structure of the riser 118 is explained in greater detailer further below.

Figure 3:
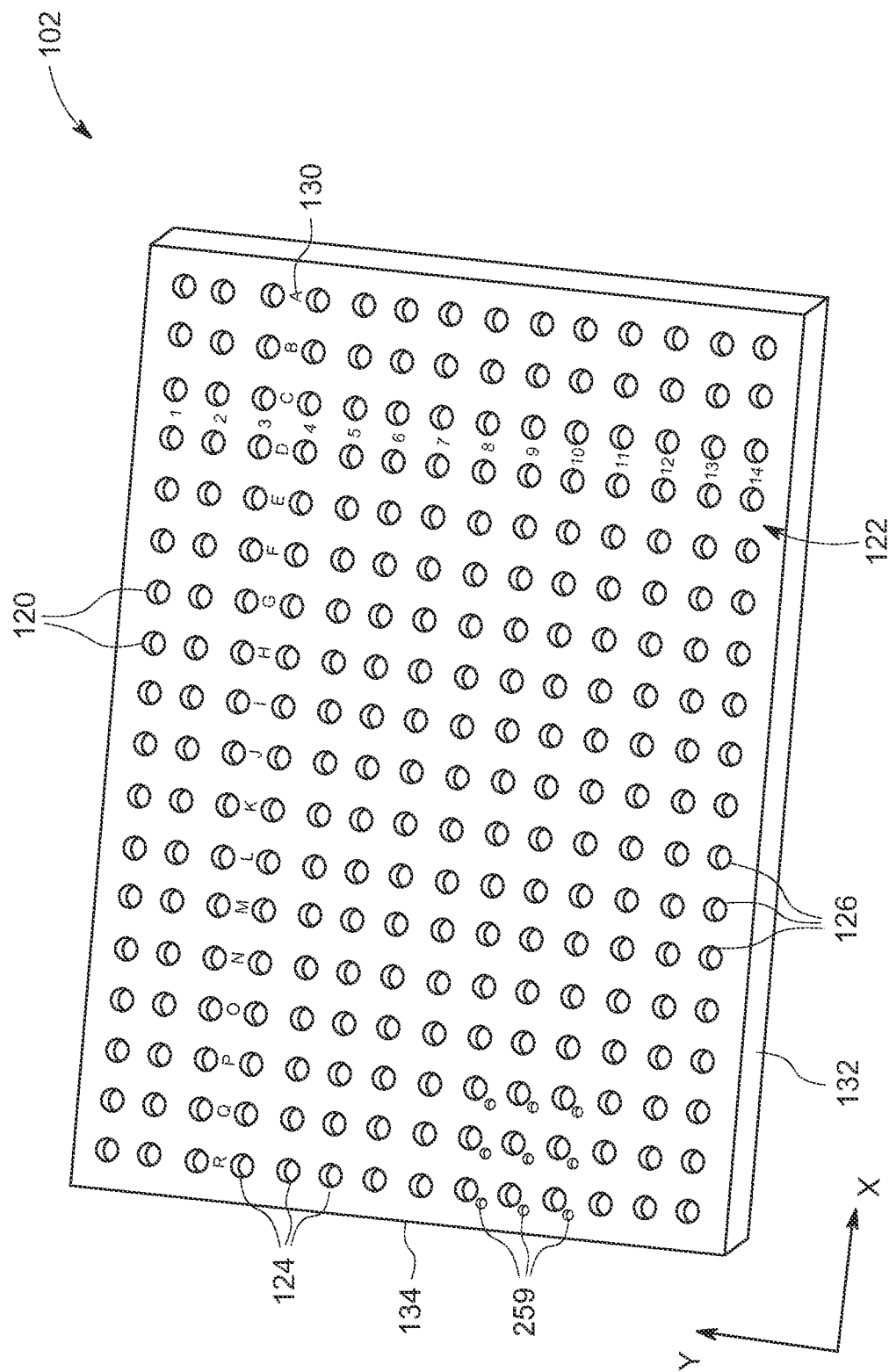
FIG. 3 illustrates the base plate depicting a coordinate system for identifying each hole of the base plate, in accordance with an embodiment of the disclosure.

Referring to FIGS. 1-3, the base plate 102 includes an array of holes 120 arranged in a grid structure 122 having a plurality of rows 124 and a plurality of columns 126 to facilitate the mounting of the plurality of riser assemblies (and hence the risers), on the base plate 102. As shown, the base plate 102 may include a rectangular structure and includes a coordinate system 130 (shown in FIG. 3) to identify each of the plurality of holes 120. As shown in FIG. 3, the coordinate system 130 preferably includes two axes, namely an X-axis, and a Y-axis extending substantially perpendicular to the X-axis. The X-axis preferably extends parallel to a first side 132 of the base plate 102, while the Y-axis extends substantially parallel to a second side 134 of the base plate 102, the second side 134 being disposed substantially perpendicular to the first side 132 of the base plate 102. As shown, holes 120 of each row 124 extend along the X-axis and each row 124 is represented by a numeric character, while holes 120 of each column 126 extend along the Y-axis and each column 126 is represented by an alphabetic character. Accordingly, each hole 120 of the base plate 102 can be located or identified or labelled using the representative character of the corresponding row and the representative character of the corresponding column in which the hole is arranged. For example, a hole 120 that lies in the Kth column and $8^{th}$ row may be labelled as "K08."

Figure 4:
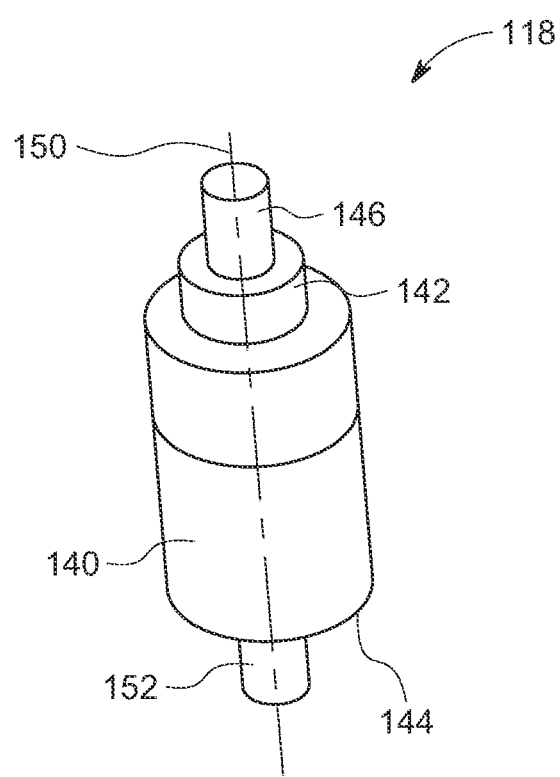
FIG. 4 illustrates an exemplary riser from a plurality of risers used for forming the riser assemblies of FIG. 2, in accordance with an embodiment of the disclosure.

Referring to FIG. 4, an exemplary riser 118 is shown. It may be appreciated that each of the risers utilized for assembling the riser assemblies, 104a, 104b, 106a, 106b, 108a, 108b, 110a, 110b, has a similar construction and structural features to facilitate an engagement with the base plate 102 and the form blocks, except for the heights of the risers. As shown, the riser 118 may include a cylindrical body 140 having a first longitudinal end 142 and a second longitudinal end 144, a first engagement structure 146 protruding outwardly from the first longitudinal end 142 along a longitudinal axis 150 of the cylindrical body 140, and a second engagement structure 152 protruding outwardly from the second longitudinal end 144 along the longitudinal axis 150. The second engagement structure 152 is adapted to extend inside one of the holes 12 to facilitate the mounting of the riser 118 on the base plate 102, while the first engagement structure 146 facilitates the mounting of the form block 112, or another riser, atop the riser 118. Preferably, the first engagement structure 146 and the second engagement structure 152 each include a pin-type structure or a frustoconical structure. In an embodiment, the first engagement structure 146 and the second engagement structure 152 may extend or retract relative to the cylindrical body 140. Alternatively, the first engagement structure 146 and the second engagement structure 152 may be removably attached to the cylindrical body 140. In such a case, the cylindrical body 140 may define a first hole (not shown) extending along the longitudinal axis 150 from the first longitudinal end 142 to receive a portion of the first engagement structure 146, and a second hole (not shown) extending inside the cylindrical body 140 along the longitudinal axis 150 from the second longitudinal end 144 to receive a portion of the second engagement structure 152. Additionally, or optionally, the riser 118 may include a marking or indicia for specifying the location on the base plate 102. The marking may correspond to a location of the hole 120 in which the second engagement structure 152 is to be inserted for engaging/mounting the riser 118 to the base plate 102. For example, the riser 118 may include a marking "K08." In such a case, the second engagement structure 152 of the riser 118 is inserted in the hole 120 disposed in the Kth column and $8^{th}$ row of the grid structure 122. In some embodiments, two or more risers 118 may be assigned to a particular hole 120. In such a case, the risers 118 assigned to the same particular hole are stacked one atop the other, thereby achieving the desired total height. It is to be appreciated that one of the risers 118 may have one of the engagement structures removed (or retracted) so that the remaining hole can receive the engagement structure on the stacked riser 118. For example, a top riser 118 to be stacked atop a bottom riser can have the second engagement structure 152 removed or retracted, thereby exposing the second hole which is configured to receive the first engagement structure 146 of the bottom riser 118.

Figure 5:
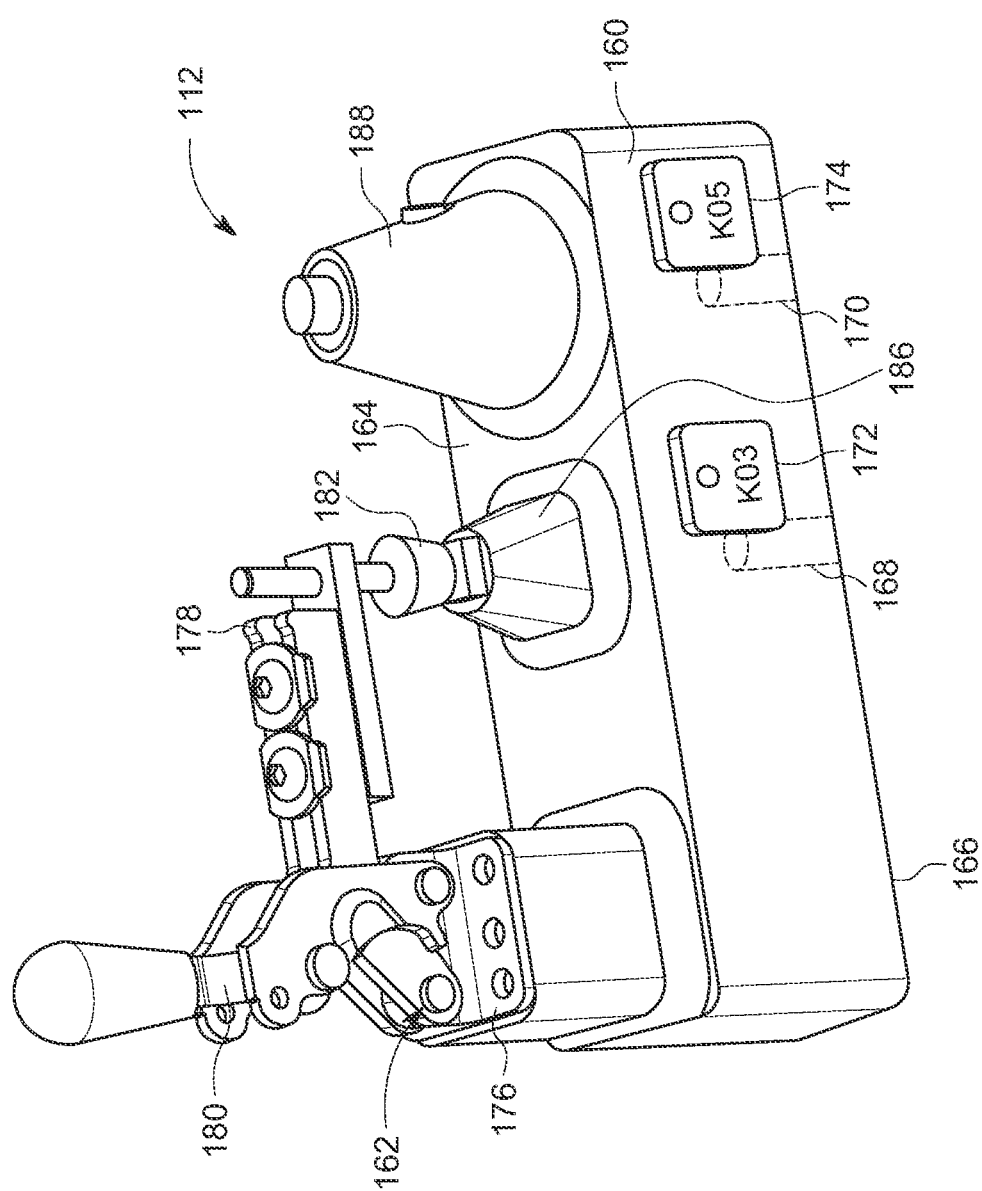
FIG. 5 illustrates a perspective view of a form block, in accordance with an embodiment of the disclosure.

Referring to FIG. 5, the first form block 112 is shown. It may be appreciated that the shape and structure of the form blocks will vary depending on the shape and structure of the part to be inspected. However, each form block, such as the first form block 112, may include a base 160 adapted to engage with one or more of the riser assemblies, for example, the first riser assembly 104a and the second riser assembly 104b. The first form block 112 may also include a clamp assembly 162 attached to the base 160 for securely mounting and supporting the workpiece 200 on the first form block 112. The base 160 may be a generally rectangular cuboid or rectangular prism structure having a top surface 164 and a bottom surface 166 disposed opposite to the top surface 164, and defines at least one hole, for example, a first hole 168 and a second hole 170 disposed spaced apart from the first hole 168, to receive second engagement structures 152. For example, the first hole 168 is adapted to receive the second engagement structure 152 of the first riser assembly 104a, while the second hole 170 is adapted to receive a second engagement structure 152 of the second riser assembly 104b. As shown, the first hole 168 and the second hole 170 each extend from the bottom surface 166 towards the top surface 164.

Furthermore, each of the form blocks 112, 114, 116 is assigned to be located over one or more holes 120 of the base plate 102. To identify the locations of the form blocks 112, 114, 116 on the base plate 102, each of form blocks 112, 114, 116 includes at least one marking or indicia corresponding to at least one hole of the form blocks 112, 114, 116. For example, the first form block 112 includes a first marking 172 to identify a location of the first hole 168 on the base plate 102, and a second marking 174 to identify a location of the second hole 170 on the base plate 102. Preferably, the first marking 172 identifies a position of one of the holes 120 of the base plate 102 with which the first hole 168 is to be positioned above. Similarly, the second marking 174 identifies a location of another one of the holes 120 of the base plate 102 with which the second hole 170 is to be positioned above. Accordingly, the first marking 172 and the second marking 174 represents the coordinates of the corresponding holes of the base plate 102.

The clamp assembly 162 includes a frame 176, an arm 178 extending outwardly from the frame 176 and movably engaged with the frame 176, and a clamp 180 for locking the arm 178 with the frame 176. The arm 178 is adapted to engage with the workpiece 200 to securely hold the workpiece 200 on the first form block 112. Furthermore, the arm 178 includes a pin 182 for securely holding the workpiece 200 to a support structure 186. Additionally, the first form block 112 includes a second support structure 188 to support and locate the workpiece 200 onto the modular gage system 100. Preferably, the support structure 188 is configured for insertion into a locating hole (not shown) on the workpiece 200. As shown, the support structures 186, 188 may extend/protrude outwardly from the top surface 164 of the base 160.

Figure 6:
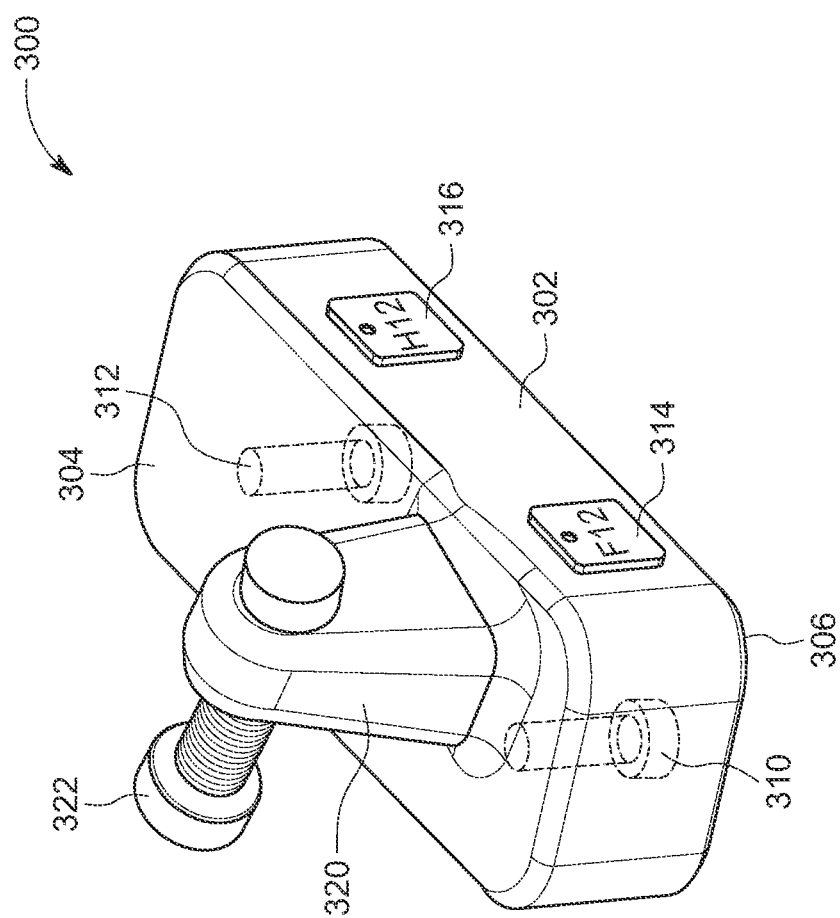
FIG. 6 illustrates a perspective view of a stab block of the modular gage system of FIG. 1, in accordance with an embodiment of the disclosure.

The modular gage system 100 may also include at least one stab block 300 (shown in FIG. 2 and FIG. 6) for identifying the presence of a characteristic or feature on the part, such as a hole on the workpiece 200. As shown in the exemplary arrangement in FIG. 2, the stab block 300 is adapted to be mounted on the seventh riser assembly 110a and the eighth riser assembly 110b. Referring to FIG. 6, the stab block 300 includes a base portion 302 adapted to engage with risers of the seventh riser assembly 110a and the eighth riser assembly 110b, and has a generally rectangular cuboid or rectangular prism structure with a top surface 304 and a bottom surface 306, the bottom surface 306 being disposed opposite to the top surface 304. Furthermore, the base portion 302 has at least one hole, for example, a first hole 310 and a second hole 312 disposed spaced apart from the first hole 310, to receive the second engagement structure 146 of the associated risers. For example, the first hole 310 is adapted to receive the second engagement structure 146 of the riser 118 of the seventh riser assembly 110a, while the second hole 312 is adapted to receive the second engagement structure 146 of the riser 118 of the eighth riser assembly 110b. As shown, the first hole 310 and the second hole 312 each extend from the bottom surface 306 towards the top surface 304.

Furthermore, the stab block 300 is assigned to be located over one or more holes 120 of the base plate 102. To identify a location of each of the holes 310, 312 over the base plate 102, the stab block 300 includes a first marking 314, or indicia, to identify a location of the first hole 310 over the base plate 102, and a second marking 316, or indicia, to identify a location of the second hole 312 over the base plate 102. Preferably, the first marking 314 identifies the position of one of the holes 120 of the base plate 102 with which the first hole 310 is to be aligned above the base plate 102. Similarly, the second marking 316 correlates to a hole 120 on the base plate 102 with which the second hole 312 is to be aligned. Accordingly, the first marking 314 and the second marking 316 represent the coordinates of the corresponding holes 102 of the base plate 102.

The stab block 300 further includes a bracket 320 extending outwardly from the top surface 304 of the base portion 302, and a stab pin 322 adapted to extend through, or from, the bracket 320. The stab pin 322 is adapted to engage with a recess defined in the workpiece 200 to identify the presence of a feature or characteristic on the workpiece 200, such as a hole in the workpiece 200.

Figure 7:
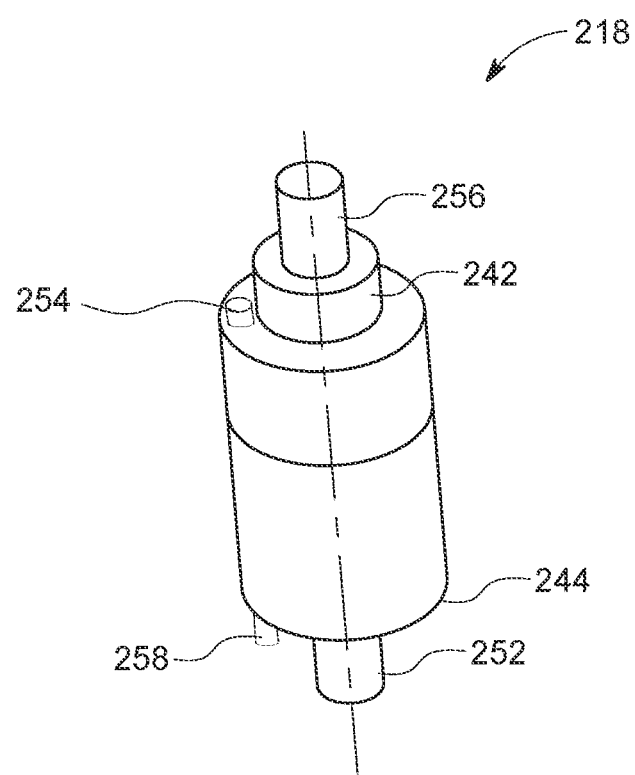
FIG. 7 illustrates an exemplary riser from a plurality of risers used for forming the riser assemblies of FIG. 2, in accordance with another embodiment of the disclosure.

An alternative exemplary riser 218 is shown in FIG. 7. Generally, the riser 218 has the same structure and features as that described above with respect to riser 118. However, riser 218 additionally includes a first alignment structure 254 extending outwardly from the first longitudinal end 242, and a second alignment structure 258 protruding outwardly from the second longitudinal end 244. When the modular gage 100 is assembled, the second alignment structure 258 is disposed within a complementary locating hole 259 in the base plate 102. The second engagement structure 252 and the second alignment structure 258 have different diameters from each other and both extend into the base plate 102, thereby ensuring that the riser 218 can only be inserted into the base plate 102 at a single unique rotational position or orientation.

Figure 8:
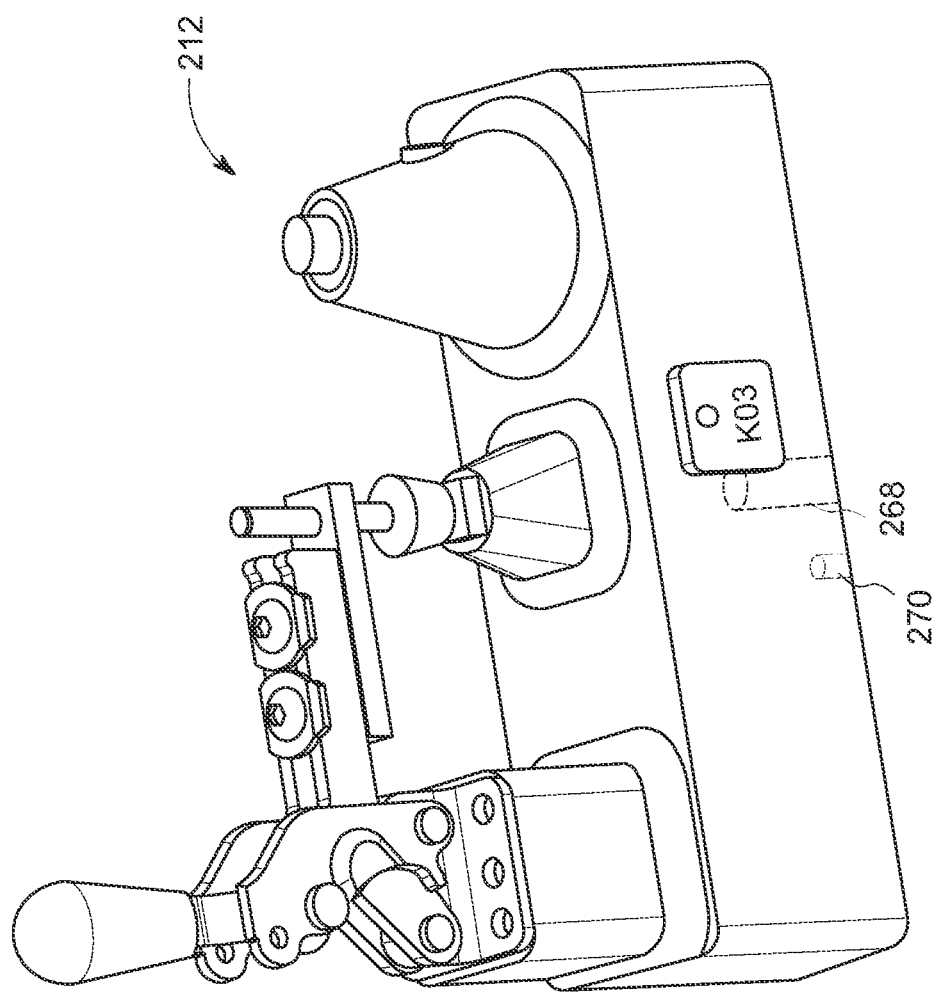
FIG. 8 illustrates a perspective view of a form block, in accordance with an embodiment of the disclosure.

An alternative exemplary form block 212 is shown in FIG. 8. Generally, the form block 212 has the same structure and features as that described above with respect to the first form block 112. However, in addition to the first hole 268 being adapted to receive a first engagement structure 256 of the riser 218, the form block 212 additionally includes a locating hole 270 that is configured to receive the first alignment structure 254 of the riser 218. The first engagement structure 256 and the first alignment structure 254 have different diameters from each other and both extend into the form block 212, thereby ensuring that the riser 218 and the form block 212 can be secured to one another at only one rotational position or orientation. Accordingly, this alternative embodiment allows the use of just one riser 218 to support the form block 212 while still ensuring correct rotational positioning of the form block 212 atop the base plate 102 since the second alignment structure 258 ensures correct rotation alignment between the riser 218 and the base plate 102, while the first alignment structure 254 ensures correct rotational alignment between the riser 218 and the form block 212, thereby ensuring that the form block 212 is rotationally oriented correctly atop the base plate 102 even though only a single riser 218 is used to support the form block 212.

Figure 9:
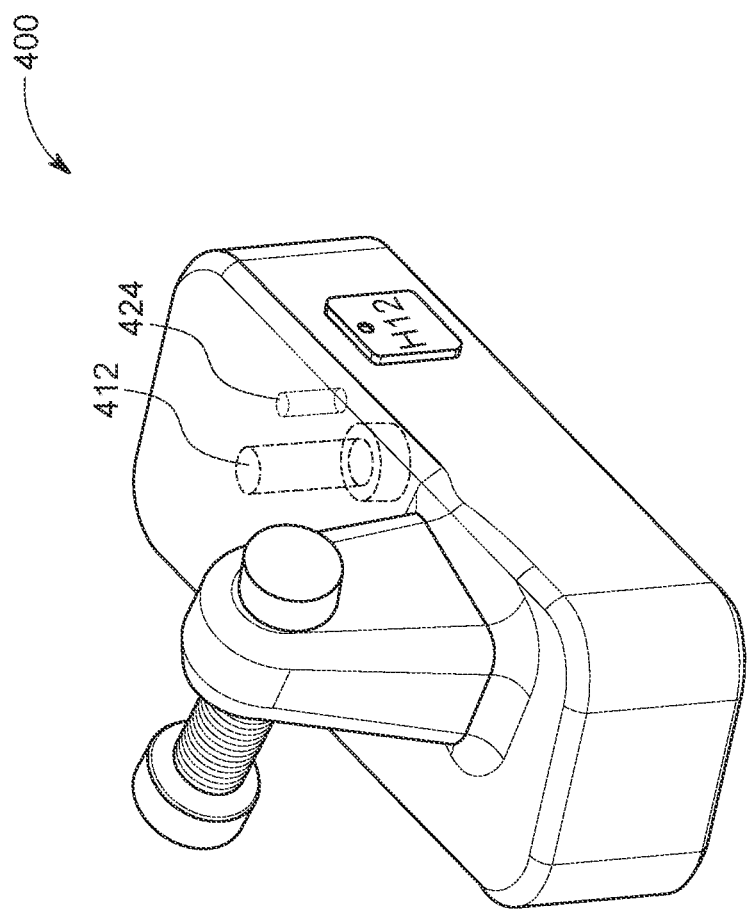
FIG. 9 illustrates a perspective view of a stab block of the modular gage system of FIG. 1, in accordance with an embodiment of the disclosure.
Figure 10:
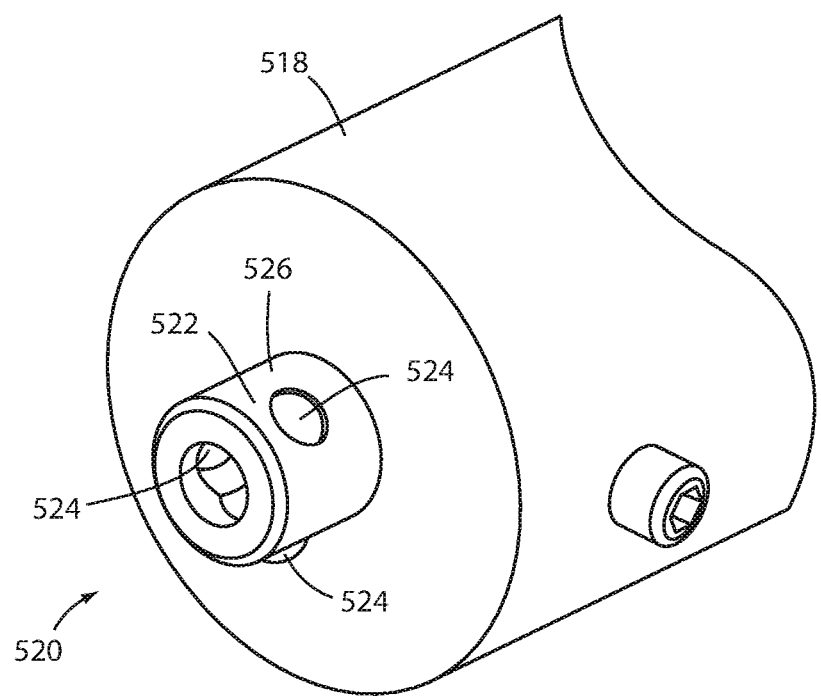
FIG. 10 illustrates an exemplary riser having a ball lock mechanism.

An alternative exemplary stab block 400 is shown in FIG. 9. Generally, the stab block 400 has the same structure and features as that described above with respect to the stab block 300. However, in addition to the second hole 412 being adapted to receive a first engagement structure 256 of the riser 218, the stab block 400 additionally includes a locating hole 424 that is configured to receive the first alignment structure 254 of the riser 218. The first engagement structure 256 and the first alignment structure 254 have different diameters from each other and both extend into the stab block 400, thereby ensuring that the riser 218 and the stab block 400 can only be secured to one another at one rotational position or orientation. Accordingly, this alternative embodiment provides for the use of just one riser 218 to support the stab block 400 while still ensuring correct rotational positioning of the stab block 400 atop the base plate 102 since the second alignment structure 258 ensures correct rotational alignment between the riser 218 and the base plate 102, while the first alignment structure 254 ensures correct rotational alignment between the riser 218 and the stab block 400. Thus, it is ensured that stab block 400 is rotationally oriented correctly atop the base plate 102 even though only a single riser 218 is used to support the stab block 400.

According to another embodiment hereof and as shown throughout FIGS. 10-13, there is provided a riser 518 which includes a ball lock mechanism 520 to secure and properly seat the riser to the base plate 102. The riser 518 includes a second engagement structure 522 which includes a plurality of balls 524 extending, or radiating, partially outward through the outer cylindrical wall 526 of the second engagement structure 522. When the ball lock mechanism 520 is activated, then the plurality of balls 524 are forced outwardly, and extend partially through the outer cylindrical wall 526.

Figure 11:
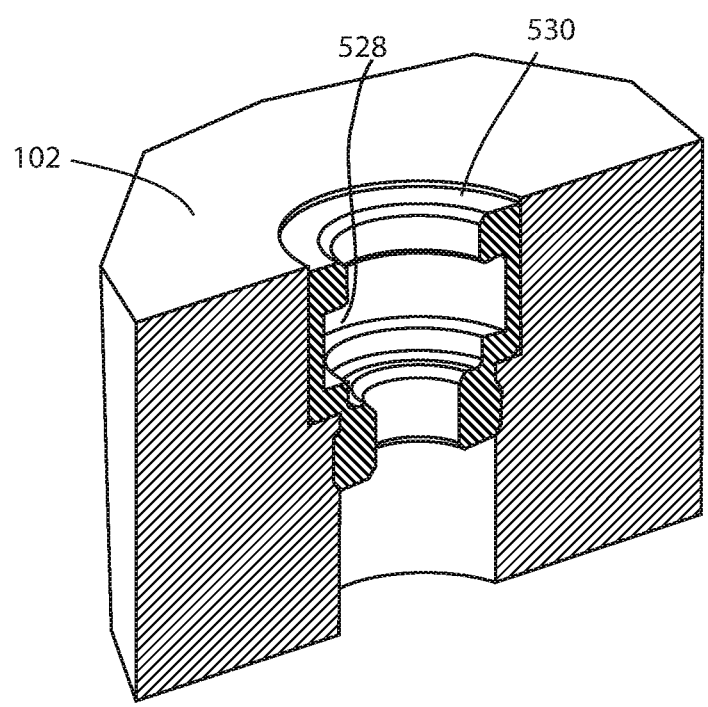
FIG. 11 illustrates a cross-sectional view of an exemplary hole in the base plate including an insert for receiving the ball lock mechanism shown in FIG. 10.

According to this embodiment, and as shown in FIG. 11, the base plate 102 includes a complementary annular recess 528 for receiving a portion of each of the plurality of balls 524 so as to lock the second engagement structure 522 into one of the holes in the array of holes 120. The annular recess 528 can be housed within an insert 530 that is placed within at least one of the holes in the array of holes 120. Alternatively, the annular recess 528 can be formed, or machined, directly within a sidewall of at least one of the holes in the array of holes 120.

Once the ball lock mechanism 520 has been activated and each ball in the plurality of balls 524 is forced outwardly and partially into the annular recess 528, then the second engagement structure 522 is drawn tightly down into the hole and locked into that position due to the outwardly extending plurality of balls 524 which are partially positioned within the annular recess 528, thereby preventing the second engagement structure 522 and the riser 518 from being withdrawn out of the hole. This additionally ensures that the riser 518 is fully seated onto the base plate 102, and is therefore correctly vertically positioned.

Figure 12:
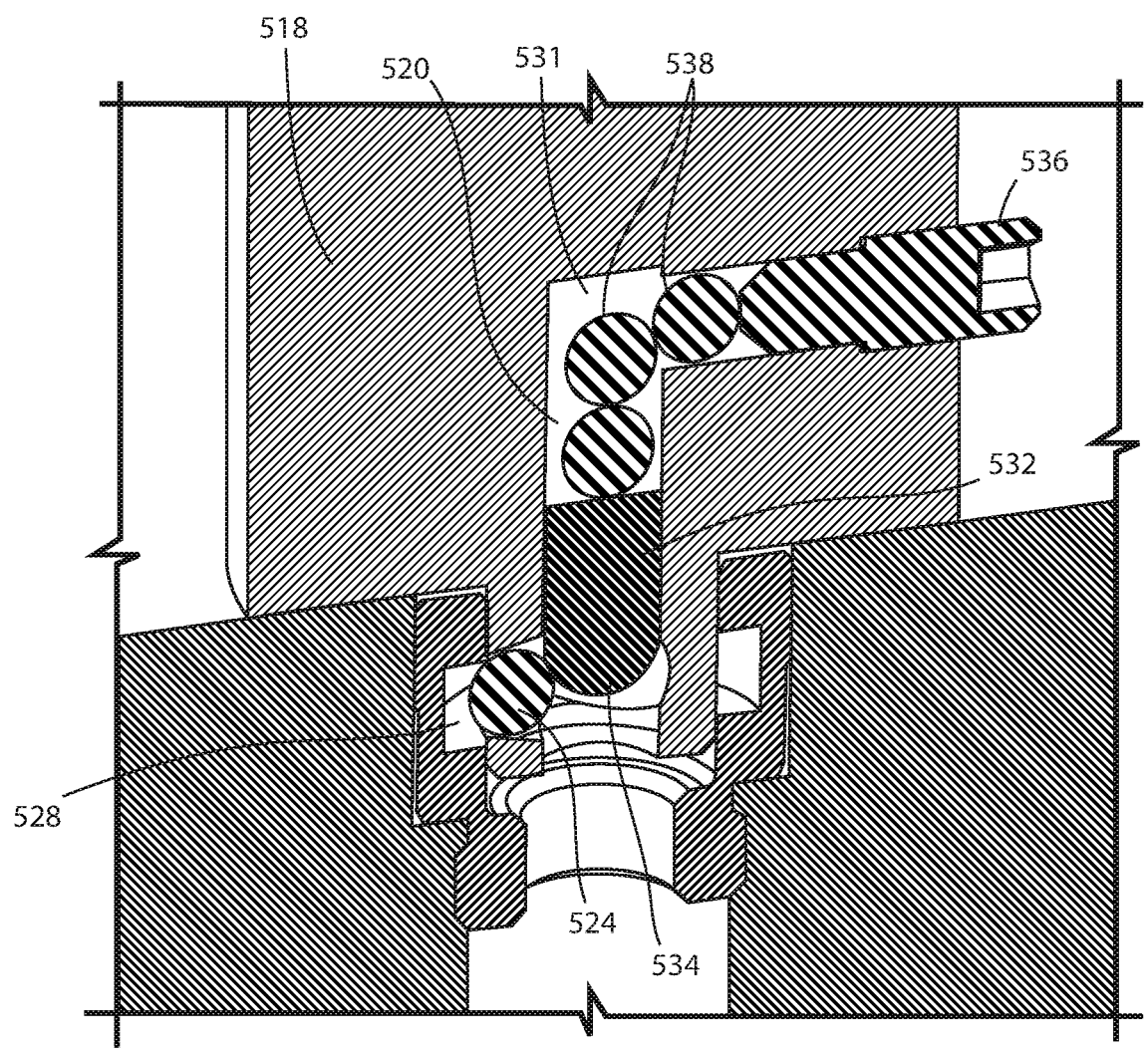
FIG. 12 illustrates a cross-sectional view of an exemplary ball lock mechanism including a plurality of actuator balls to transfer the sliding motion from the actuator shaft to the sliding shaft.
Figure 13:
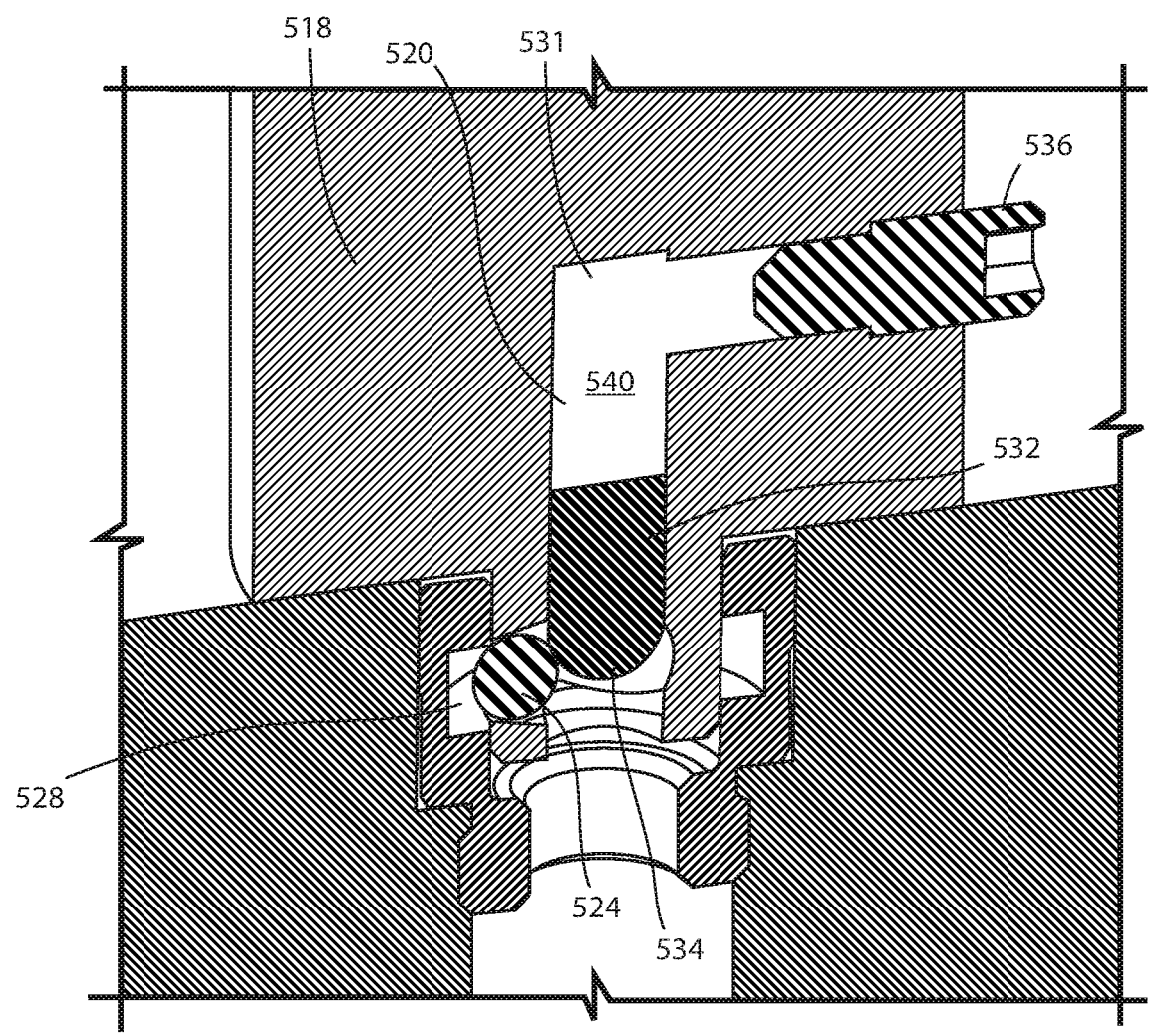
FIG. 13 illustrates a cross-sectional view of an exemplary ball lock mechanism including a hydraulic fluid to transfer the sliding motion from the actuator shaft to the sliding shaft.

The ball lock mechanism 520 is shown in greater detail and in cross-section in FIGS. 12 and 13. The ball lock mechanism 520 includes an "L"-shaped channel 531 extending through a portion of the riser 518. A vertical section of the channel 531 includes a sliding shaft 532 having an actuator end 534 which abuts against each of the balls in the plurality of balls 524 (only one ball being shown in FIGS. 12 and 13 due to the cross-sectional views shown). Preferably the actuator end 534 is rounded, as shown in the drawings. The horizontal section of the channel 531 includes an actuator shaft 536 which is configured to receive an input from an external force to activate or deactivate the ball lock mechanism 520. Preferably, and as shown in the drawings, the actuator shaft 536 is a set screw which is threadingly engaged with the wall of the riser 518 to drive the actuator shaft 536 into or out of the riser 518.

According to one embodiment, there is provided a plurality of actuator balls 538 to effectuate the translational movement between the actuator shaft 536 and the sliding shaft 532. As shown in FIG. 12, the plurality of actuator balls 538 are disposed within the channel 531 and each of the actuator balls 538 are adjacent to one another, as well as being adjacent to the actuator shaft 536 and the sliding shaft 532. When the actuator shaft 536 is moved further into the riser 518, then the actuator shaft 536 accordingly moves the aligned and adjacent plurality of actuator balls 538, which in turn apply a force against and move the sliding shaft 532. The spherical geometry of the actuator balls 538 allows the translational movement of the actuator shaft 536 to extend through a bend or curve and result in translational movement of the sliding shaft 532. According to another embodiment hereof, and as shown in FIG. 13, the channel 531 can alternatively be filled with hydraulic fluid 540 rather than the plurality of actuator balls 538. As understood by those having ordinary skill in the art, hydraulic fluid 540 can also be used to effectuate translational movement between opposed ends of a closed channel, such as the channel 531.

In order to inspect the workpiece, the modular gage system 100 needs to be properly set up, or assembled, corresponding to each workpiece 200. As such, a table corresponding to each workpiece 200 is provided for setting up various risers 118 on the base plate 102. An exemplary table 700 is shown in FIG. 14. The table 700 includes four columns with a first column 702 indicating locations of the plurality of the riser assemblies, such as the riser assemblies 104*a*, 104*b*, 106*a*, 106*b*, 108*a*, 108*b*, on the coordinate system 130, a second column 704 indicating the part numbers for the bottom riser for each riser assembly, a third column 706 indicating the part numbers for the middle riser of each riser assembly, and a fourth column 708 indicating the part numbers for the top riser of each riser assembly. Accordingly, each row in the table 700 specifies the top, middle, and bottom risers to be placed at each specified location on the base plate 102. For example, hole K03 on the base plate requires riser number 0003_02101 as the bottom riser, no middle riser, and riser number 0003_02001 as the top riser.

The modular gage system 100 may allow the measurement of multiple workpieces of different dimensions since different risers having different heights may be used and positioned on different holes 120 of the base plate 102. Also, the form blocks 112, 114, 116 are preferably the only components that are custom manufactured for each workpiece, and therefore the cost and timing required to build the modular gage system is much less than that of the entire welded gage system in the prior art. In addition, many manufacturers (or end users) will come to acquire their own off-the-shelf components of the gage systems, such as base plates, which can be reused to assemble modular gages for a variety of different parts. This is particularly useful once a part (or workpiece 200) ends production and the gage for it becomes obsolete. Further, the base plate 102, the risers 118, and form blocks 112, 114, 116, each can be stored separately in small boxes. Therefore, the modular gage system 100 can essentially be stored on a shelf, rather than taking up a significant amount of space on the floor, a shelf, etc. In addition, the modular gage system 100 can be assembled easily and quickly using the instructions for assembling each gage using the coordinate system 130 and the instructions specifying which riser(s) are placed in and above each hole 120.

It should be understood that the foregoing description is only illustrative of the aspects of the disclosed embodiments. Various alternatives and modifications can be devised by those skilled in the art without departing from the aspects of the disclosed embodiments. Accordingly, the aspects of the disclosed embodiments are intended to embrace all such alternatives, modifications, and variances that fall within the scope of the appended claims. Further, the mere fact that different features are recited in mutually different dependent or independent claims does not indicate that a combination of these features cannot be advantageously used, such as a combination remaining within the scope of the aspects of the disclosed embodiments.

I claim:

1. A modular gage system comprising:
 a base plate including an array of holes and a coordinate system to identify each hole;
 a plurality of risers, each riser being assigned to a particular hole; and
 at least one form block configured to be positioned atop one or more of the risers, each form block being assigned to be located over a particular hole.

2. The modular gage system of claim 1 wherein the at least one form block is configured to support a workpiece.

3. The modular gage system of claim 2 including at least one stab block configured to be positioned atop one or more of the risers, each stab block being assigned to be located over a particular hole.

4. The modular gage system of claim 1 wherein two or more risers may be assigned to a particular hole, and the risers assigned to the same particular hole are stacked one atop the other.

5. The modular gage system of claim 1 wherein each form block is assigned to two or more particular holes.

6. The modular gage system of claim 1 including at least one stab block configured to be positioned atop one or more of the risers, each stab block being assigned to be located over a particular hole.

7. The modular gage system of claim 1 wherein at least one riser in the plurality of risers includes a first longitudinal end and a second longitudinal end, and a first engagement structure protruding outwardly from the first longitudinal end along a longitudinal axis of the riser, and a second engagement structure protruding outwardly from the second longitudinal end along the longitudinal axis, and a first alignment structure protruding outwardly from the first longitudinal end and a second alignment structure protruding outwardly from the second longitudinal end.

8. The modular gage system of claim 7 wherein the second engagement structure includes a ball lock mechanism having a plurality of balls configured to selectively be retracted within the second engagement structure or to selectively radiate partially outward through an outer cylindrical wall of the second engagement structure.

9. The modular gage system of claim 7 wherein the form block includes a first hole configured to receive the first engagement structure, and a locating hole configured to receive the first alignment structure.

10. The modular gage system of claim 9 wherein the second engagement structure includes a ball lock mechanism having a plurality of balls configured to selectively be retracted within the second engagement structure or to selectively radiate partially outward through an outer cylindrical wall of the second engagement structure.

11. The modular gage system of claim 7 wherein the stab block includes a second hole configured to receive the first engagement structure, and a locating hole configured to receive the first alignment structure.

12. The modular gage system of claim 11 wherein the second engagement structure includes a ball lock mechanism having a plurality of balls configured to selectively be retracted within the second engagement structure or to selectively radiate partially outward through an outer cylindrical wall of the second engagement structure.

13. The modular gage system of claim 1 wherein the form block includes a first hole configured to receive the first engagement structure, and a locating hole configured to receive the first alignment structure.

14. The modular gage system of claim 1 wherein the stab block includes a second hole configured to receive the first engagement structure, and a locating hole configured to receive the first alignment structure.

15. The modular gage system of claim 1 wherein the second engagement structure includes a ball lock mechanism having a plurality of balls configured to selectively be retracted within the second engagement structure or to selectively radiate partially outward through an outer cylindrical wall of the second engagement structure.

16. The modular gage system of claim 15 wherein the base plate includes an annular recess, the annular recess being configured to receive a portion of each of the plurality of balls when the plurality of balls are radiated partially outward through the outer cylindrical wall of the second engagement structure, thereby locking the second engagement structure into one of the holes in the array of holes.

17. The modular gage system of claim 15 wherein the ball lock mechanism includes an "L"-shaped channel extending through a portion of the riser, a vertical section of the channel includes a sliding shaft having an actuator end which abuts against each of the balls in the plurality of balls, and a horizontal section of the channel includes an actuator shaft which is configured to receive an input from an external force to selectively activate or deactivate the ball lock mechanism.

18. The modular gage system of claim 17 wherein the base plate includes an annular recess, the annular recess being configured to receive a portion of each of the plurality of balls when the plurality of balls are radiated partially outward through the outer cylindrical wall of the second engagement structure, thereby locking the second engagement structure into one of the holes in the array of holes.

19. The modular gage system of claim 1 wherein the base plate includes an annular recess.

20. The modular gage system of claim 19 having an insert placed within at least one hole in the array of holes, the insert including an annular recess.

* * * * *